United States Patent [19]

Urano

[11] 3,918,069
[45] Nov. 4, 1975

[54] ENERGIZATION CONTROL MECHANISM IN CAMERA ELECTRICAL NETWORK

[75] Inventor: Fumio Urano, Saitama, Japan

[73] Assignee: Asahi Kogaku Kogyo Kabushiki Kaisha, Tokyo, Japan

[22] Filed: May 6, 1974

[21] Appl. No.: 467,345

[30] Foreign Application Priority Data
May 11, 1973 Japan.................................. 48-1723

[52] U.S. Cl.................. 354/23 R; 354/48; 354/268
[51] Int. Cl.² ........................................ G03B 17/00
[58] Field of Search ......... 354/23, 48, 60, 266, 268, 354/269

[56] References Cited
UNITED STATES PATENTS

| | | | |
|---|---|---|---|
| 3,425,327 | 2/1969 | Stuper et al. ...................... | 354/23 X |
| 3,608,448 | 9/1971 | Imai ...................................... | 354/23 |
| 3,693,524 | 9/1972 | Furata .............................. | 354/268 X |

Primary Examiner—Joseph F. Peters, Jr.
Attorney, Agent, or Firm—Wolder & Gross

[57] ABSTRACT

A camera includes a light measuring network connected to a current source through a normally open switch and an axially depressable shutter release rod closing the switch at the initial part of its shutter release stroke. A first spring biased lever engages a notch in the rod to releasably lock it in its fully retracted position and a second spring biased lever engages a longitudinal groove in the rod when in its switch closing position to limit the axial movement of the rod between its uppermost switch closing position and its shutter release position. The second lever is retracted to release the rod by the retraction of the film winding lever and a manually operable knob is rotatable to a first position to retract the first lever and to an opposite second position to retract the second lever from the rod.

10 Claims, 9 Drawing Figures

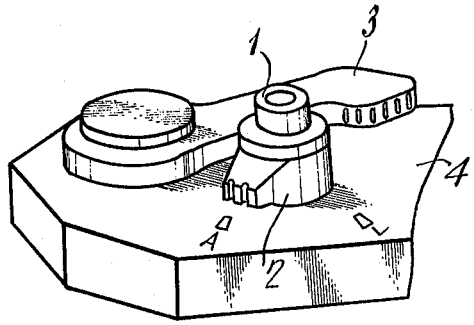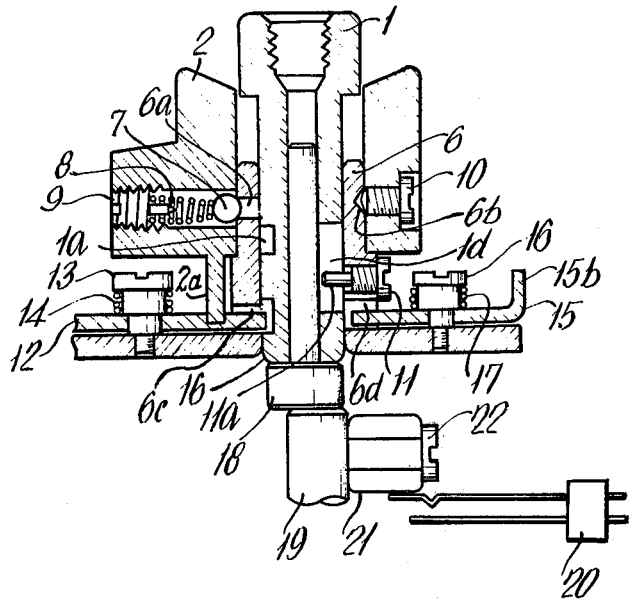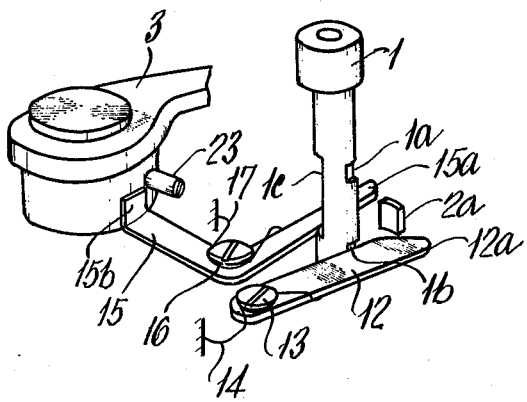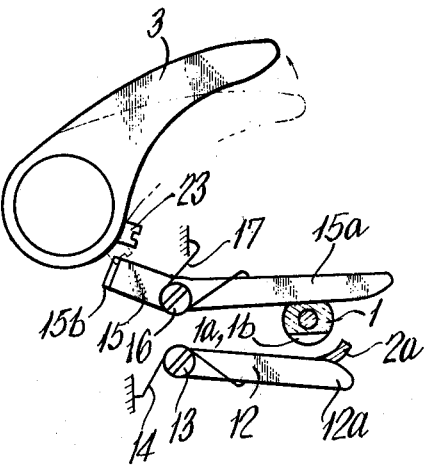

ENERGIZATION CONTROL MECHANISM IN CAMERA ELECTRICAL NETWORK

BACKGROUND OF THE INVENTION

The present invention relates generally to improvements in cameras having light measuring networks and it relates more particularly to an improved mechanism in a camera for controlling the electrical energization of a camera contained electrical network.

In the various types of popular cameras equipped with an exposure meter, it would be highly convenient if the light measuring electric circuit were always in an energized condition so that the photometric operation may be effected without requiring any preparatory operations. The power source used in such a camera, however, is generally an ultra-miniature battery and it is most necessary to minimize the power consumption of such a battery. For the latter reason it is highly desirable that the electric circuit be kept open and deenergized when the camera is not being used. However, the aforementioned requirements are contradictory to each other.

Various mechanisms have heretofore been employed and proposed for opening and closing a power switch arranged in a camera electric circuit. Among these, is a mechanism for closing the power switch at an early stage in the operation of the shutter release button which possesses the advantage of a short circuit energization time prior to the shutter release and a reduced power consumption of the battery. However, this mechanism has the drawback that the release button must be operated to some limited extent each time it is desired to perform a photometric operation before photographing. The conventional mechanisms for controlling the energization of a camera light measuring network are highly inconvenient and otherwise leave much to be desired.

SUMMARY OF THE INVENTION

It is a principal object of the present invention to provide an improved camera containing a battery energized electrical network.

Another object of the present invention is to provide an improved camera having a battery energized light measuring network.

Still another object of the present invention is to provide an improved mechanism for controlling the energization of a camera contained light measuring network.

A further object of the present invention is to provide an improved mechanism of the above nature which possesses the advantages of conventional mechanisms but avoids the drawbacks thereof and is characterized by its reliability, ruggedness ease and convenience of operation and high versatility and adaptability.

The above and other objects of the present invention will become apparent from a reading of the following description taken in conjunction with the accompanying drawings which illustrate a preferred embodiment thereof.

The present invention contemplates the provision of an improved camera electrical network control mechanism in which the drawbacks and inconveniences of the conventional mechanisms are minimized and the electric circuit is easily opened and deenergized when the camera is not used. The film wind-up lever, which has a suitable configuration and is located in a position convenient to the film wind-up operation, often acts as an impediment to the housing of the camera in the camera case. In order to facilitate the camera housing operation of the camera, the wind-up lever generally has a so-called preparatory angle so that it can be retracted into a deeper or greater recessed position than its normal wind-up position. To prevent the release button from being unintentionally operated many cameras are provided with a release lock means. The above mentioned two operation means, the release lock means and the wind-up lever, must be set in preselected positions when the camera is stored or left unused for a long period of time with the film wound up. Therefore if the camera is arranged in such a manner that the electric circuit contained therein is opened and deenergized by either upon bringing the wind-up lever into its retracted storage position or by locking the release button in its retracted position, then the consumption of the power battery is minimized. Furthermore, by arranging these members so as to be operable in association with the circuit power switch opening mechanism in an early stage of the release operation, numerous highly desirable effects are achieved as will be hereinafter described.

BRIEF DESCRIPTION OF THE DRAWINGS

FIG. 1 is a fragmentary perspective view of a portion of a camera provided with a network control mechanism embodying the present invention;

FIG. 2 is a vertical sectional view along the medial longitudinal plane of the shutter release button thereof;

FIG. 3 is a fragmentary perspective view of the power switch control mechanism.

FIG. 4 is a plan view thereof with the mechanism shown in a switch closed condition.

DESCRIPTION OF THE PREFERRED EMBODIMENT

Figure 5:
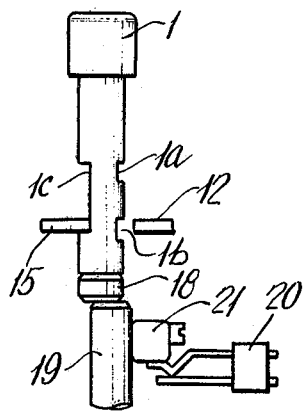
FIG. 5 is a fragmented elevational view of the mechanism shown in FIG. 4.

Referring now to the drawings which illustrate a preferred embodiment of the present invention, the reference numeral 1 generally designates a release button in the shape of an elongated rod having an axial bore and an enlarged outer head, the release button 1 coaxially extending through an axial bore in a manually operable release button lock member 2. The release lock member 2 is rotatable at a predetermined angle between opposite positions designated by the indicia A and L. When the release lock member 2 is in position A, as shown in FIG. 1, the release button 1 is released so that it can be depressed; while when the release lock member 2 is in position L the release button 1 is in a locked condition. Located on the camera body 4 proximate the lock member 2 is a film wind-up lever 3.

Mounted for rocking about respective vertical axes on opposite sides of and offset from release button 1, are a switch holding member or lever 15 and a release button lock lever 12. As is best seen in FIG. 3 the release button 1 has formed therein a lower release lock recess or groove 1b, a timing groove or recess 1a located above and aligned with recess 1b and a switch holding vertically elongated groove 1c diametrically opposite grooves 1a and 1b. To prevent the rotation of the release button 1 an elongated vertical slot 1d is formed in the release button 1 (FIG. 2). The grooves 1a, 1b and 1c and the elongated slot 1d will be hereinafter described. The release lock member 2 has arranged in a radial bore therein a ball 7, a compression spring 8 and a spring set screw 9 arranged therein to inwardly urge ball 7 into releasable engagement with spaced recess whereby to effect the release click locking of the release lock member 2 in Positions A and L shown in FIG. 1. The release lock member 2 is also provided with a depending projection or finger 2a on the bottom surface thereof for controlling the switch holding lever 15 and the release button lock lever 12. A hollow shaft 6 supports the release button 1 and release lock member 2. The shaft 6 has in its outer face click recess 6a and a V-shaped groove 6b extending along the entire circumference of the shaft 6 for retaining the release lock member 2 by means of screws 10 against movement in the vertical direction. Threaded into the shaft 6 is a screw 11 having a pin-shaped forward end 11a which vertically slideably engages the elongated slot 1d formed in the release button 1 thereby preventing the rotation of the release button 1. The lever 12 is pivoted to swing on a screw 13 and functions to releasably lock the release button 1. The lever 15 is pivoted to swing on a screw 16 and functions to hold the power switch in its closed position. Springs 14 and 17 are carried by screws 13 and 16 and are arranged to urge the levers 12 and 15, respectively, toward the release button 1. Indicated at 6c and 6d are openings in the wall of the release lock member 2 through which the levers 12 and 15 can reach the release button 1. A release pin 18 slideably telescopes the release button 1 and is used when the camera shutter is to be released with a release cable coupled to the release button 1. A conventional axially movable release rod 19 for releasing the mirror mechanism is actuated by the release button 1, the release rod 19 being shown with the bottom portion cut away having mounted thereon a radially projecting actuating member 21 of insulating material by means of a screw 22. A normally open power switch 20 is connected in such a manner that when it is in its closed position the electric circuit of the camera can be energized and includes an actuating arm located in the vertical path of and below actuating member 21 when the latter is in its raised position.

When the release lock member 2 is in position A, as seen in FIG. 1, the release button lock lever 12 is retracted from engagement with the release button 1 by means of the projection 2a, so that the release button 1 can be manually depressed externally of the camera. In an early stage of the depression of the release button 1 the power switch 20 is closed by the depression of the insulating member 21 by way of the release pin 18 and release rod 19, and toward the end of the depression of the release button 1 the shutter (not shown) is released and starts operation.

When the release lock member 2 is in position L the release button lock lever 12 is released and the spring 14 acts counter-clockwise as viewed in FIG. 3, so that the release button lock lever 12 is urged into engagement with one of the grooves 1b or 1a formed in the release button 1 thereby preventing the movement of the release button 1 in the vertical direction. More specifically, when the release lock member 2 is set in position L prior to the depression of release button 1 and a releasing operation the release button lock lever 12 is spring advanced into the groove 1b to thereby prevent the depression of the release button. After releasing, when the release lock member 2 is set in position L the release button lock lever 12 is spring advanced into the other groove 1a to thereby prevent the restoring movement of the release button 1 in the upward direction by the action of a spring (not shown). In a flash-light photographing, the foregoing operation permits a timing photographing operation.

The foregoing release lock operation is already known. An improvement contemplated by the present invention is achieved by the provision of the switch holding lever 15. As seen in FIG. 3 the switch holding lever 15 is arranged to mechanically cooperate with the depending projection 2a formed on the release lock member 2 and with a radially projecting pin 23 integrally formed on the hub of the wind-up lever 3. In this way the movement of at least one of the projection 2a and pin 23 conveys information to and effects the operation of the switch holding lever 15.

As shown in FIG. 4 when the wind-up lever 3 is pulled out or advanced in the direction of the arrow from its fully retracted storage position to a wind-up position and the power switch 20 is closed by depressing the release button 1 under the condition in which the release lock member 2 is set in position A as seen in FIG. 1, then the switch holding lever 15 which has been released by the projection 2a is spring advanced into registry with the groove 1c formed in the release button 1. FIG. 5 shows the vertical positional relation between the members illustrated in FIG. 4. When the wind-up lever 3 and the release lock member 2 are respectively in the aforesaid positions, the power switch 20 is maintained in its closed condition following the closing thereof by the depression of the release button 1.

Figure 6:
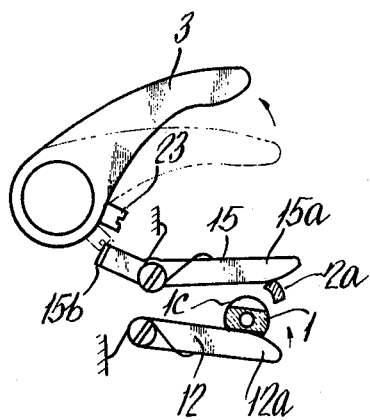
FIG. 6 is a view similar to FIG. 4 with the mechanism shown in a release button retracted switch open condition.
Figure 7:
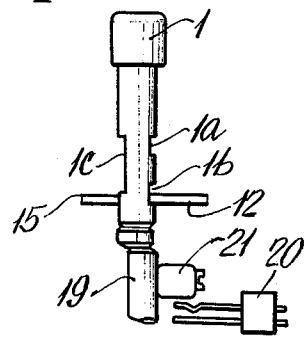
FIG. 7 is an elevational view of the mechanism shown in FIG. 6.
Figure 8:
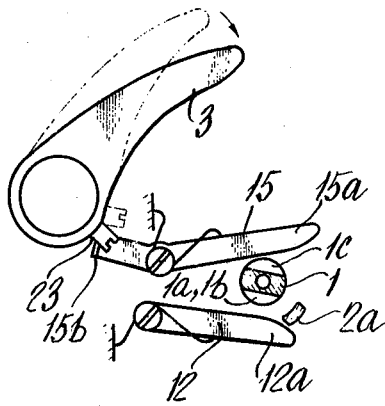
FIG. 8 is a view similar to FIG. 4 with the mechanism shown in a release button fully retracted and switch open condition.
Figure 9:
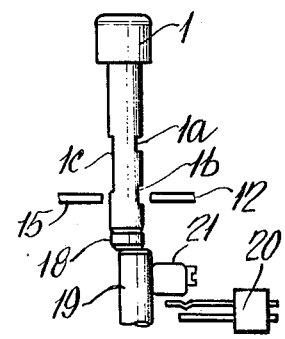
FIG. 9 is an elevational view of the mechanism shown in FIG. 8.

FIGS. 6 and 7 are similar views to FIGS. 4 and 5 respectively and showing the mechanism under conditions where the release lock member 2 is set in position L as seen in FIG. 1. FIGS. 8 and 9 show the mechanism in the position where the release member 2 is set in position A and the wind-up lever 3 has been retracted from its wind-up position to its storage position. Under these conditions the power switch 20 which has heretofore been held in its closed position by means of the switch holding lever 15 is released to its open condition by reason of the disengagement of the release button 1 by levers 12 and 15 as effected by the projection 2a and pin 23. When the wind-up lever 3 is in its wind-up position and when the release button 1 is not locked (or when the camera is in an ordinary photographing mode), the power switch 20 is closed upon depression of the release button 1 and is maintained in its closed position during the subsequent photographing operation. Thus a photometric operation can be quickly performed without requiring any preparatory operations. When the wind-up lever 3 is retracted into its storage position for housing the camera in the camera case or when the camera shutter is not released for an extended period of time, the power switch 20 may be opened by the operation of the release lock. This prevents the power battery from being consumed. Furthermore, upon returning the wind-up lever 3 to its storage position with the release button 1 unlocked, the power switch 20 is closed in an early stage of the ordinary release operation and a photometric operation may thus be effected. After completion of the release operation upon removal of the finger from the release button 1, the power switch 20 is automatically opened. It will be appreciated from the foregoing that the power switch device of the present invention permits various photographing operations which have been unattainable by the use of the earlier devices in which the power switch is operable in direct association with the wind-up lever so that it is closed and opened upon retraction and advance of the wind-up lever.

Among the effects and advantages achieved by the mechanism of the present invention are the following:

1. When the release button is set in the release position, the power switch is closed in an early stage of the release operation and a photometric operation can be effected irrespective of whether the wind-up lever is in its storage position or its extracted position.

2. When the wind-up lever is advanced or extracted to its wind-up position and when the release button is in its release position, if the power switch is closed in an early stage of the release button operation, then the power switch is conveniently maintained in its closed position for photometric operation.

3. When the power switch is held in its closed position during a photographing operation, it can be opened either by returning the wind-up lever to its storage position or by effecting a release button lock operation. This is highly advantageous for minimizing the consumption of the power battery.

4. By incorporating the power switch mechanism of the present invention into a camera equipped with a release button lock mechanism, various highly desirable effects can be attained with a simple construction as seen in the illustrated and described embodiment which is provided with only a power switch lock lever 15, a shaft 16 for pivotably supporting the power switch lock lever 15, a spring 17 and a pin 23.

It will be appreciated from the foregoing that the power switch mechanism of the present invention is of very simple construction and eliminates the disadvantages which characterize the earlier mechanisms.

While there has been described and illustrated a preferred embodiment of the present invention it is apparent that numerous alterations, omissions and additions may be made without departing from the spirit thereof.

I claim:

1. In a camera including a light determining network, means including a switch connecting said network to a source of current, a shutter release member movable between a retracted position and an advance shutter release position, means for closing said switch in response to said shutter release member being in advance of a predetermined point between said advanced and retracted positions; and first locking means for releasably locking said shutter release member against retraction from said predetermined point.

2. The camera of claim 1 including second locking means for releasably locking said shutter release member in its retracted position.

3. The camera of claim 1 including a film winding lever swingable from a fully retracted position in a film winding direction and returnable to said fully retracted position and means responsive to said winding lever being in its retracted position for releasing said first locking means from said shutter release member.

4. The camera of claim 1 including second locking means releasably locking said shutter member in its retracted position and a manually operable member movable between opposite first and second positions respectively releasing said first and second locking means.

5. The camera of claim 1 wherein said shutter release member comprises a rod axially movable between said retracted and advanced positions and having a rearwardly facing shoulder thereon movable with said rod and said locking means comprises a stop member movable into and out of registry with the axial path of said shoulder and engaging said shoulder when said rod is in a switch closing position and retracted from the shutter release position thereof.

6. The camera of claim 5 including a film winding lever swingable from a retracted position in a film winding direction and returnable to said retracted position, said stop member being movable into registry with the path of said shoulder with the advance of said lever from its retracted position and out of registry with said path with the retraction of said lever.

7. The camera of claim 6 including means for releasably locking said shutter release member in its retracted position and manually operative means alternatively retracting said stop member from the path of said path of said shoulder and releasing said means locking and release member in its retracted position.

8. The camera of claim 5 wherein said switch comprises an actuating arm and said switch closing means includes an actuating arm movable with said rod into actuating engagement with said switch actuating arm with the advance of said rod.

9. In a camera including an exposure meter and a power switch and a shutter release movable between advanced and retracted positions, a control mechanism for said switch comprising means for closing said switch in response to the early stage of advance of said shutter release, means for retaining said switch in its closed position in response to the early stage of advance of said shutter release, a wind-up lever movable between a storage position and a winding position, and means responsive to the storage position of said wind-up lever for releasing said switch to its open position and responsive to the winding position of said wind-up lever for enabling said switch retaining means.

10. In a camera including an exposure meter and a power switch and a shutter release movable between advance and retracted positions, a control mechanism for said switch comprising means for closing said switch in response to the early stage of advance of said shutter release, means for retaining said switch in its closed position in response to the early stage of advance of said shutter release, a release lock member movable between a release and a lock position and means responsive to the release position of said release lock member for enabling said switch retaining means and responsive to the lock position of said release lock member for releasing said switch to its open position.

* * * * *

UNITED STATES PATENT OFFICE
CERTIFICATE OF CORRECTION

PATENT NO. : 3,918,069
DATED : November 4, 1975
INVENTOR(S) : FUMIO URANO

It is certified that error appears in the above-identified patent and that said Letters Patent are hereby corrected as shown below:

[30] Foreign Application Priority Data

May 11, 1973   Japan............48-51723

Signed and Sealed this second Day of March 1976

[SEAL]

Attest:

RUTH C. MASON
*Attesting Officer*

C. MARSHALL DANN
*Commissioner of Patents and Trademarks*